United States Patent
Vuoristo

(10) Patent No.: US 11,040,847 B2
(45) Date of Patent: Jun. 22, 2021

(54) CORE CHUCK SYSTEM

(71) Applicant: Valmet Technologies Oy, Espoo (FI)

(72) Inventor: Tommi Vuoristo, Tuusula (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 16/219,560

(22) Filed: Dec. 13, 2018

(65) Prior Publication Data

US 2019/0233249 A1   Aug. 1, 2019

(30) Foreign Application Priority Data

Dec. 14, 2017   (FI) ........................................ 20176117

(51) Int. Cl.

| | |
|---|---|
| *B65H 75/24* | (2006.01) |
| *B23B 31/107* | (2006.01) |
| *B65H 19/12* | (2006.01) |
| *B65H 75/18* | (2006.01) |
| *B65H 18/08* | (2006.01) |
| *B23B 31/173* | (2006.01) |

(52) U.S. Cl.
CPC ....... *B65H 75/242* (2013.01); *B23B 31/1071* (2013.01); *B65H 18/08* (2013.01); *B65H 19/126* (2013.01); *B65H 75/185* (2013.01); *B23B 31/16158* (2013.01); *B65H 2301/413* (2013.01); *B65H 2301/41346* (2013.01); *B65H 2402/64* (2013.01)

(58) Field of Classification Search
CPC .......... Y10T 403/599; Y10T 279/1045; Y10T 403/592; B23B 31/263; B23B 31/1071; B23B 31/16158; B65H 75/242; B65H 75/185; B65H 19/126; B65H 18/08; B65H 2402/64; B65H 2301/41346; B65H 2301/413

See application file for complete search history.

(56) References Cited

U.S. PATENT DOCUMENTS

| | | | | |
|---|---|---|---|---|
| 3,464,642 A | | 9/1969 | Kobel | |
| 3,857,526 A | * | 12/1974 | Dischert | G11B 15/662 242/573.9 |
| 4,453,449 A | * | 6/1984 | Hollmann | F16B 21/165 285/316 |
| 4,715,553 A | * | 12/1987 | Hatakeyama | B65H 75/242 242/573.7 |
| 4,897,014 A | * | 1/1990 | Tietze | B25J 15/0206 279/2.23 |

(Continued)

FOREIGN PATENT DOCUMENTS

| | | |
|---|---|---|
| CN | 201694694 U | 1/2011 |
| EP | 0688732 B1 | 9/1998 |

(Continued)

OTHER PUBLICATIONS

Search Report for FI 20176117 from the Finnish Patent and Registration Office dated Jul. 13, 2018.

*Primary Examiner* — Eric A. Gates
*Assistant Examiner* — Paul M Janeski
(74) *Attorney, Agent, or Firm* — Stiennon & Stiennon

(57) ABSTRACT

A core chuck system (10) comprising a core chuck (11) and a spindle (12) onto which the core chuck (11) is lockable, which core chuck system (10) comprises a ball locking mechanism, a locking button (15) and a cone connection (C).

8 Claims, 2 Drawing Sheets

(56) References Cited

U.S. PATENT DOCUMENTS

| | | | | |
|---|---|---|---|---|
| 5,267,704 | A | * | 12/1993 | Kitamura ................. B41J 15/04 |
| | | | | 242/570 |
| 5,322,234 | A | * | 6/1994 | Robert ................... A47K 10/40 |
| | | | | 242/596.7 |
| 5,597,135 | A | | 1/1997 | Vandersteene |
| 6,123,285 | A | | 9/2000 | Border et al. |
| 2009/0060644 | A1 | * | 3/2009 | Blanchard ............ A01B 33/028 |
| | | | | 403/321 |
| 2009/0110477 | A1 | * | 4/2009 | Seger ................... F16B 21/165 |
| | | | | 403/376 |

FOREIGN PATENT DOCUMENTS

| | | | | |
|---|---|---|---|---|
| KR | 101462839 | B1 | | 11/2014 |
| WO | WO-2004060606 | A1 | * | 7/2004 ......... B23B 31/1071 |

* cited by examiner

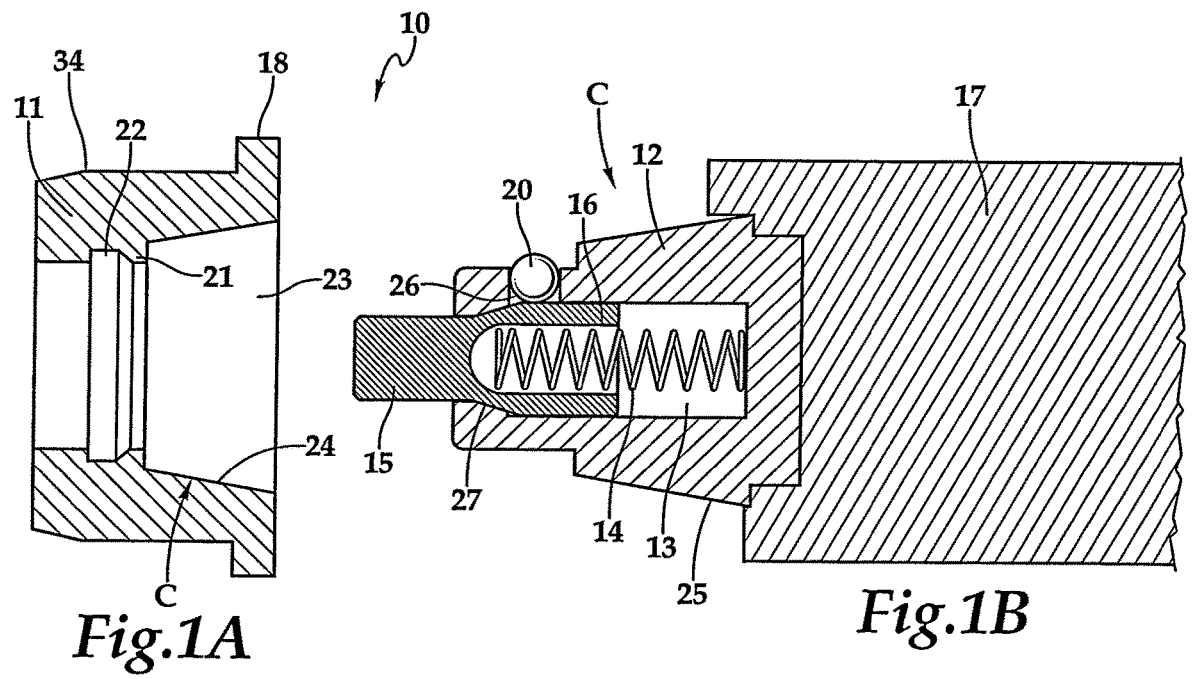
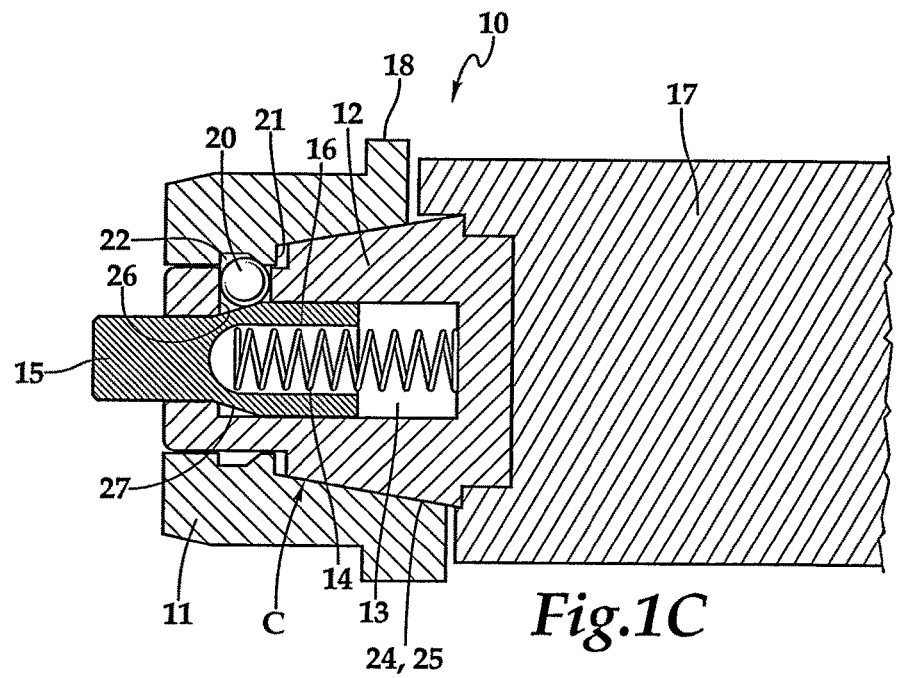

CORE CHUCK SYSTEM

CROSS REFERENCES TO RELATED APPLICATIONS

The application claims priority on Finnish App. No. FI20176117, filed Dec. 14, 2017, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a core chuck system for cores of a winder for winding fiber webs, particularly for winding longitudinally slitted paper and board webs into partial web rolls. Especially the invention relates to a core chuck system comprising a core chuck and a spindle onto which the core chuck is lockable.

It is known that a fiber web, e.g. paper, is manufactured in machines which together constitute a paper-manufacturing line which can be hundreds of meters long. Modern paper machines can produce over 450,000 tons of paper per year. The speed of the paper machine can exceed 2,000 m/min and the width of the paper web can be more than 11 meters.

In paper-manufacturing lines, the manufacture of paper takes place as a continuous process. A paper web completing in the paper machine is reeled by a reel-up around a reeling shaft, i.e., a reel spool into a parent roll the diameter of which can be more than 5 meters and the weight more than 160 tons. The purpose of reeling is to modify the paper web manufactured as planar to a more easily processable form. On the reel-up located in the main machine line, the continuous process of the paper machine breaks for the first time and shifts into periodic operation.

The web of parent roll produced in paper manufacture is full-width and even more than 100 km long, so it must be slit into partial webs with suitable width and length for the customers of the paper mill, and wound around cores e.g., a hollow cardboard cylindrical tube, on which so-called customer rolls are formed. These customer rolls are then shipped from the paper mill to customers. This slitting and winding up of the web takes place as known in an appropriate separate machine, i.e., a slitter-winder.

On the slitter-winder, the parent roll is unwound, the wide web is slit on the slitting section into several narrower partial webs which are wound up on the winding section around winding cores, such as spools of plastic, card board, wood or metal, into customer rolls. When the customer rolls are completed, the slitter-winder is stopped and the wound rolls i.e. the so-called set is removed from the machine and new cores for new partial web rolls are to be transferred to winding stations for winding a new set of partial web rolls. Then, the process is continued with the winding of a new set. These steps are repeated periodically until the paper runs out of the parent roll, whereby a parent roll change is performed, and the operation starts again as the unwinding of a new parent roll.

In patent publication EP 0688732 is disclosed a fixing end for cores used in winding, said fixing end comprising wedge pieces moving in an axial direction and holes bored beveled on the outer circumference of the fixing end, out of which the holding surface of the wedge pieces of the fixing end, moving in axial direction, has been arranged to ascend for locking the fixing end to the inner surface of the core, wherein the radial motion of the holding surface of the wedge piece out and in relative to the outer surface of the fixing end is forced-controlled and that the forced-control has been arranged to be produced by mediation of the axial motion of a wedge piece. The fixing end for cores comprises a substantially cylindrical frame having an outer surface, which frame is insertable into an open end of the core and the beveled holes formed in said frame are opening onto said outer surface thereof, wherein the movable, elongate wedge pieces are situated in each of the holes, each of the wedge pieces has the holding surface at one end thereof proximate to the outer surface and engageable with an inner surface of the core, and the means for moving move each of the wedge pieces in a direction of its respective longitudinal axis in the respective one of the holes such that said holding surfaces of the edge pieces are moved radially outward relative to the frame until the holding surfaces extend beyond said outer surface of the frame and engage and lock said fixing end to the inner surface of the core.

A core chuck is a device which fits in each end of a of a roll core for example in each end of a cardboard roll core to allow the roll core to turn between spindles.

When the core diameter of the cores changes, the core lock needs to have corresponding core chucks. According to practice typically in these cases the operator of the winder changes the core chucks manually using a special tool to unlock the chuck to be replaced and to lock the chuck with a required diameter for the cores to be used in the following winding of the partial web rolls around the cores. Typically, two different kinds of locking systems are used according to the prior art: the core chuck will be locked in place with a standard bolt that needs an Allen® or hex key for opening and for tightening the chuck and the so called fast core lock for which a special tool is used to turn the locking mechanism open and closed. This is a manual operation and, as the core locks and the corresponding chucks are located inside the winder in a difficult location to be reached, this change operation is performed in a difficult position of the operation in view of ergonomics and simultaneously the operator changing the chuck has to handle the old chuck, the new chuck, the opening/tightening tool and the locking element. Even safety risks exist as an operator might have to work on top of the winding drums and under the rider roll. Thus there exist problems increased due to the long time needed for the change and due to the complicated change operation.

SUMMARY OF THE INVENTION

An object of the invention is to create a core chuck system where the problems relating to the change of the core chuck have been eliminated or at least minimized.

An object of the invention is to create a type of core chuck system for the cores of the winders.

To achieve the above-mentioned objects and those which come out later, the core chuck system comprises a ball locking mechanism, a locking button and a cone connection.

According to the invention the core chuck system comprises a core chuck and a spindle onto which the core chuck is lockable, in which the core chuck system comprises a ball locking mechanism, a locking button and a cone connection.

According to an advantageous feature of the invention the ball locking mechanism comprises locking balls, a locking groove and a stopping protrusion.

According to advantageous feature of the invention the cone connection is formed between an inner cone surface of the core chuck and an outer cone surface of the spindle.

According to an advantageous feature of the invention the cone angle of the cone connection is 1:1-1:10, which can also be expressed as a cone angle of 10-100% or as a cone angle of 5 degrees and 43 minutes to 53 degrees and 8 minutes.

According to an advantageous feature of the invention the core chuck is a rotational symmetric part formed as a mantle type part with an inner center opening.

According to an advantageous feature of the invention the outer surface of the locking button comprises a functional surface formed for providing a force to affect the locking balls for locking and for releasing the locking of the core chuck system.

According to an advantageous feature of the invention the core chuck system is manually operable.

According to an advantageous feature of the invention the force needed to unlock the core chuck from the spindle is less than 150 N, advantageously less than 100 N. By the invention a new type of a core chuck system is achieved, in which no tools are needed to change the core chuck and the core chuck is manually operable and the operator pushes the lock button of the core chuck system by hand and pulls the core chuck to be changed out and pushes the new core chuck in. Thus, the change time is shortened and the change of the chuck is easier. The core chuck system according to the invention has a ball locking mechanism and a cone connection for accurate and firm connection. As when the core chuck system according to the invention is used and no tool is needed to unlock and lock the chuck better safety and ergonomics are achieved as the hands of the operator are free as the operator that changes the core chuck needs to handle just chucks. The core chuck system according to the invention can also be manufactured compact in size due to the inventive connecting arrangement of the chuck parts with the ball locking mechanism and the cone connection. The force needed to unlock the core chuck is low, less than 100 N is needed.

BRIEF DESCRIPTION OF THE DRAWINGS

Next, the invention will be described in more detail with reference to the figures of the enclosed drawing, to the details of which the invention is intended by no means to be narrowly limited.

FIG. 1A is a schematically shown, cross-sectional view of a core chuck according to the invention.

FIG. 1B is a schematically shown, cross-sectional view of a spindle according to the invention which receives the core chuck of FIG. 1A.

FIG. 1C is a schematically shown, cross-sectional view of a core chuck system combining the core chuck of FIG. 1A with the spindle of FIG. 1B.

DESCRIPTION OF THE PREFERRED EMBODIMENTS

Figures 2A, 2B:
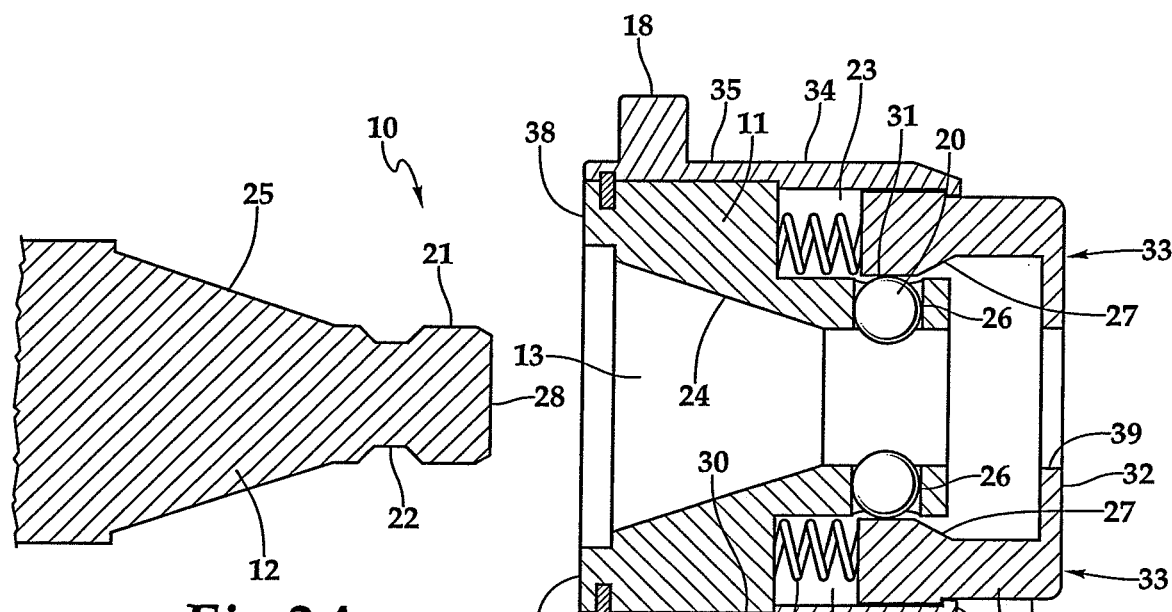
FIG. 2A is a schematically shown, cross-sectional view of an alternative embodiment spindle according to the invention.
FIG. 2B is schematically shown, cross-sectional view of an alternative embodiment core chuck according to the invention which receives the spindle of FIG. 2A.

In the figures the same reference signs are used for corresponding parts and part combinations unless otherwise mentioned.

In FIGS. 1A-1C is shown an example of a core chuck system 10; in FIG. 1A is shown a core chuck 11 of the core chuck system 10 detached, in FIG. 1B is shown a spindle 12 and other parts of the core chuck system 10 with the core chuck detached and in FIG. 1C is shown the core chuck system 10 assembled with the core chuck 11 locked at its place. By, reference numeral 17 is denoted a support bar at the end of which the core chuck system 10 is attached.

As shown in FIG. 1A the core chuck 11 is a rotational symmetric part formed as a mantle type part with an inner center opening 23, which comprises a stopping protrusion 21 and a locking groove 22, which both substantially circumscribe the inner opening 23 extending through the core chuck 11 and an inner cone surface 24 of the cone connection C of the core chuck system 10. The inner cone surface 24 extends partially through length of the core chuck 11, substantially from the stopping protrusion 21 to end on the side of the spindle 12. The core chuck 11 may have a flange 18 as shown in FIGS. 1A, 1C, 2B and 2C. The flange 18 may serve to prevent the core chuck from being inserted too far in to the hollow of an axially extending cylindrical opening of a roll core, or to protect the outer edges of the core or the paper roll formed thereon.

As shown in FIG. 1B the core chuck system 10 further comprises a spindle 12 with an outer cone surface 25 extending form the support bar 17 outwardly and ending near a groove 26 circumscribing the spindle 12. The groove 26 is located just before the locking balls 20. The outer end of the spindle 12 is cylindrical and has a circular end in which has an opening from which a locking button 15 extends. The spindle 12 has a center bore 13 in which a spring 14 and the locking button 15 are located. The spring 14 may extend into a bore 16 made in the locking button 15, the bore allows for a longer spring and greater axial movement of the locking button and secures the spring 14 in its place. The locking button 15 is loaded by the spring 14 to extend from the opening in the circular end of the spindle 12. The outer surface of the locking button 15 has a functional surface 27, for example a cone. The functional surface 27 is biased by the spring providing a force to affect the locking balls 20 to form a ball detent for locking and for releasing the core chuck 11 of the core chuck system 10.

As shown in FIG. 1C the core chuck 11 is lockable by a locking mechanism comprising one or more locking balls 20 and the stopping protrusion or detent 21 on the cone connection C. The locking mechanism is loaded by the spring 14 located in the center bore 13 of the spindle 12. In FIG. 1C the core chuck system 10 is in a locked position, in which the core chuck 11 is locked in place on the spindle 12. The locking balls 20 when located in the locking groove 22 behind the stopping protrusion 21 keeping the core chuck 11 in its place on the spindle 12. The locking button 15 occupies the center bore 13, and the outer end of the locking button extends outwardly of the spindle 12. The functional surface 27 keeps the locking balls 20 in the locking groove 22. The spring 14 biases the functional surface 27 to push the ball or balls against the stop 21 securing the locking. When the locking button 15 is pressed at its outwards extending end the spring 14 is compressed and the functional surface 27 releases the locking balls 20 to move radially inwardly of the cylindrical surface of the spindle 12 freeing the stop protrusion 21 and thus the core chuck 11 so it can be removed from the spindle 12. Between the core chuck 11 and the spindle 12 is provided the cone connection C, formed by the inner cone surface 24 of the core chuck 11 and by the outer cone surface 25 of the spindle 12. Advantageously the cone angle is 1:1-1:10.

In the example of FIGS. 1A-1C the locking mechanism 20, 21 is formed in connection with the spindle 12 and the core chuck 11 has no moving parts.

Figure 2C:
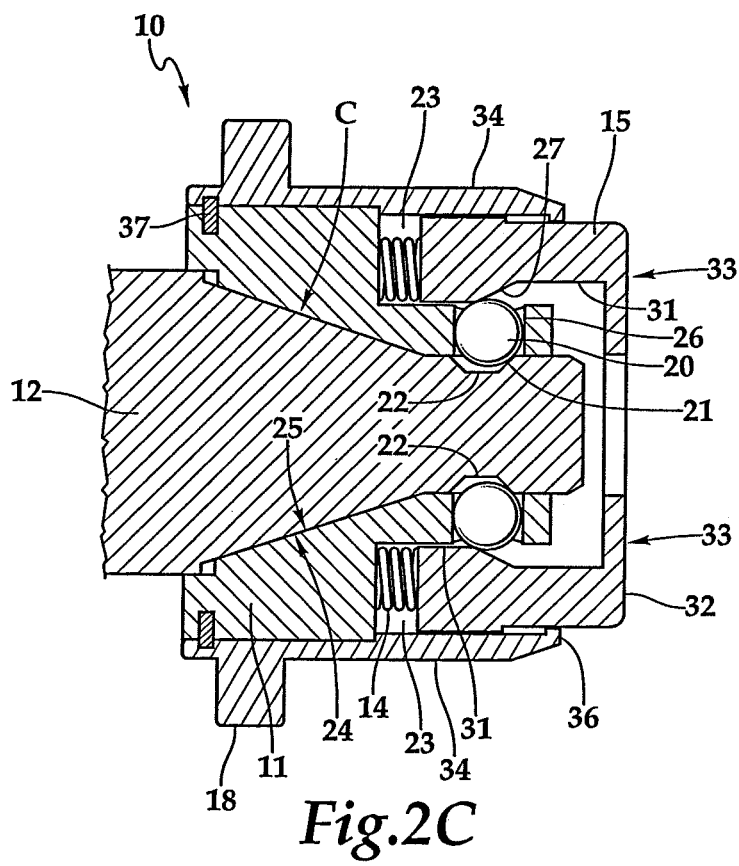
FIG. 2C is a schematically shown, cross-sectional view of an alternative embodiment core chuck system combining the core chuck of FIG. 2A with the spindle of FIG. 2B.

In the example of FIGS. 2A-2C the locking mechanism 20, 21 is formed in connection with the core chuck 11 and the spindle 12 has no moving parts.

In FIGS. 2A-2C is shown an example of a core chuck system 10; in FIG. 2A is shown a spindle 12 of the core chuck system 10 detached, in FIG. 2B is shown a core chuck 11 and other parts of the core chuck system 10 with the core chuck detached and in FIG. 2C is shown the core chuck system 10 assembled with the core chuck 11 locked at its place on the spindle 12.

As shown in FIG. 2A the core chuck system 10 comprises a spindle 12 with an outer cone surface 25 extending away from the support bar 17. A locking groove 22 extends around the spindle 12 circumscribing the spindle 12 for engaging with locking balls 20 as shown in FIG. 2B. The locking groove 22 has a stopping protrusion 21 which retains the locking balls 20. The outer end 28 of the spindle 12 is cylindrical.

As shown in FIG. 2B the core chuck system 10 further comprises a core chuck 11, which is a rotational symmetric part formed as a mantle type part with an inner center opening 23 with an inner cone surface 24 of the cone connection C of the core chuck system 10. The inner cone surface 24 extends partially through the length of the core chuck 11. Inside the core chuck a groove 26 for the locking balls 20 is located. The core chuck 11 comprises a center bore 23 in which a spring 14 and a locking button 15 are located. The spring 14 provides the force needed for urging the balls 20 in to the locking groove 22 on the spindle 12. The locking button 15 is arranged to compress the spring or springs 14. The inner surface of the locking button 15 comprises a functional surface form 27, for example a cone which applies the spring force to affect the locking balls 20 for locking and for releasing spindle 12 of the core chuck system 10 shown in FIGS. 2A-2B. The functional surface form 27 forms a simple machine known as an inclined plane which applies mechanical advantage to increase the force the spring applies to the ball 20. Conversely, the inclined plane of the functional surface 27 has a mechanical disadvantage which resists movement of the button under a load applied to the ball by the spindle 12, particularly the stopping protrusion 21.

As shown in FIG. 2C the core chuck 11 is lockable by a locking mechanism comprising the locking balls 20 and the stopping protrusion 21 and the cone connection C. The locking mechanism is spring loaded by the spring 14 located in the center bore 23 of the core chuck 11. In FIG. 2C the core chuck system 10 is in a locked position, in which the core chuck 11 is locked on the spindle 12. When so locked the locking balls 20 extend into the locking groove 22 behind the stopping protrusion 21 and so keep the core chuck 11 in its place on the spindle 12. The locking button 15 is in the center bore 23 and the outer end of the locking button extends outwards of the core chuck 10 opposite the inner cone surface 24. The functional surface 27 located on an inner circumference 31 of cylindrical sides 34 of the button 15 keeps the locking balls 20 in the locking groove 22 of the spindle 12. The spring 14 biases the balls 20 by the functional surface 27 into the groove 22 locking the spindle 12 to the core chuck 11. When the locking button 15 is pressed at its outwards extending end 32 as shown by arrows 33 the spring 14 is compressed and the functional surfaces 27 move to release the locking balls 20 from being locked in the locking groove 22 and engaging with the stopping protrusion 21 so the core chuck 11 is released and can be removed from the spindle 12. Between the core chuck 11 and the spindle 12 is provided the cone connection C, formed as the inner cone surface 24 of the core chuck 11 and as the outer cone surface 25 of the spindle 12. Advantageously the cone angle is 1:1-1:10. As shown in FIG. 2B the core chuck has a flange 18 connected to a cylindrical shell 30 which forms an outer cylindrical surface 35 which engages the hollow axial opening in a fiber web roll core. The cylindrical shell 30 has a button lip 36 which retains the button 15 and a snap ring or retaining ring 37 with complementary grooves in the cylindrical shell 30 and the inner cone body 38. The button may have an opening 39 in the outwards extending end 32.

When the core chuck system 10 is used no tools are needed to change the core chuck 11 and the core chuck 11 is manually operable. The operator only pushes the lock button 15 of the core chuck system 10 at its outer end by hand and pulls the core chuck 11 to be changed out and pushes the new core chuck 11 in onto the spindle 12. The force needed to unlock the core chuck 11 is low, less than 150 N, advantageously less than 100 N is needed.

It should be understood that ball(s) 20 may be retained on the core chuck 11 or the spindle 12 for radially outward movement in the groove 26, e.g., one or several holes by the outer edges of the groove/holes being spaced apart less than the diameter defined by the ball(s). Thus, the portion of the sphere defined by the ball that extends beyond the groove 26 outer edges is less than one half of the sphere defined by the ball.

Above the invention has been described referring to one advantageous example only by this is not meant to limit the invention to this example but many alterations and modifications are possible in various components of the invention.

I claim:

1. A fiber web roll core chuck system comprising:
   a spindle for supporting a fiber web roll core, the spindle formed by a convex cone mounted to or forming part of a roll support bar, the convex cone having a convex conical connection surface and defining an axis of the convex cone which axis defines a first direction extending toward the roll support bar;
   a core chuck having portions forming a concave conical surface, shaped to mate with the convex conical connection surface so that an axis defined by the concave conical surface is coincident with the axis of the convex cone when said concave conical surface and said convex conical connection surface are mutually engaged;
   wherein the core chuck defines a cylindrical surface exterior to the concave conical surface, wherein the cylindrical surface is formed about the axis defined by the concave conical surface, the cylindrical surface engageable with an interior surface of a fiber web roll core;
   wherein at least one of the spindle and the core chuck has at least one ball mounted thereto and biased by a spring to move toward the other of the spindle and the core chuck, wherein the same other of the spindle and the core chuck has a locking groove which receives the at least one ball to lock the spindle and the core chuck together with the concave conical surface engaged with the convex conical connection surface;

a lock button forming an outer end of the core chuck system, the lock button being centered about the axis of the convex cone, and mounted to the same other of the spindle and the core chuck for movement along the axis of the convex cone, in the first direction toward the roll support bar;

wherein the lock button when pushed moves in the first direction to compress the spring such that the at least one ball is movable, thereby unlocking the spindle and the core chuck to allow separation of said concave conical surface and said convex conical connection surface;

wherein the core chuck concave conical surface forms a frustum having a base from which the concave conical surface extends; and wherein the frustum, opposite the base, is followed by a portion of the core chuck forming a protrusion extending inwardly of the concave conical surface wherein the protrusion is followed by a portion of the core chuck forming a groove for receiving the at least one ball.

2. The system of claim 1 wherein the at least one ball mounted to at least one of the spindle and the core chuck, is engaged by an inclined plane forming a portion of the button.

3. The system of claim 1 wherein the core chuck has a flange extending radially outwardly of and surrounding the cylindrical surface and has a conical bevel terminating the cylindrical surface, wherein the conical bevel facilitates insertion of the cylindrical surface into one end of a fiber web roll core and the flange prevents the core chuck from moving further into the roll core.

4. The system of claim 1 wherein the concave conical surface and the convex conical connecting surface have a cone angle of 1:1-1:10.

5. The system of claim 1 wherein the core chuck is a rotational symmetric part formed as a mantle type part with an inner center opening.

6. The system of claim 1 wherein the roll core chuck system is manually operable.

7. The system of claim 1 wherein application of a force less than 150-100 N unlocks the core chuck from the spindle.

8. A fiber web core chuck system comprising:

a spindle attached to a support bar;

a core chuck releasably connected to the spindle, a first direction being defined extending from the spindle to the core chuck, the core chuck having an inner center opening which is radially symmetric about a first axis, wherein portions of the core chuck extend radially inwardly into the center opening to define a stopping protrusion and a locking groove positioned away from the spindle in the first direction from the stopping protrusion, and wherein the core chuck has portions defining an inner cone surface which opens toward the spindle and which is between the stopping surface and the spindle;

wherein the spindle has portions defining an outer cone surface extending from the support bar outwardly in the first direction and ending near a groove in the spindle, the spindle groove communicating with a center bore which extends in the first direction and which opens towards the core chuck;

a lock button which is received within the spindle center bore, wherein the lock button has an external functional surface facing said spindle groove;

a spring which is positioned within the center bore and extends between portions of the spindle and the lock button to bias said lock button in the first direction; and at least one ball disposed within the spindle groove and engaged with the functional surface of the lock button, the functional surface of the lock button being biased by the spring providing a force to affect the at least one ball, the core chuck engaging the spindle in a locked position in which the at least one ball within said spindle groove extends within the core chuck locking groove preventing the removal of the core chuck in the first direction and restricting the movement in the first direction of the stopping protrusion, and when the lock button is depressed toward the spindle the functional surface of the lock button releases the at least one ball to move radially inwardly, freeing the stop protrusion and thus the core chuck so it can be removed from the spindle.

* * * * *